UNITED STATES PATENT OFFICE.

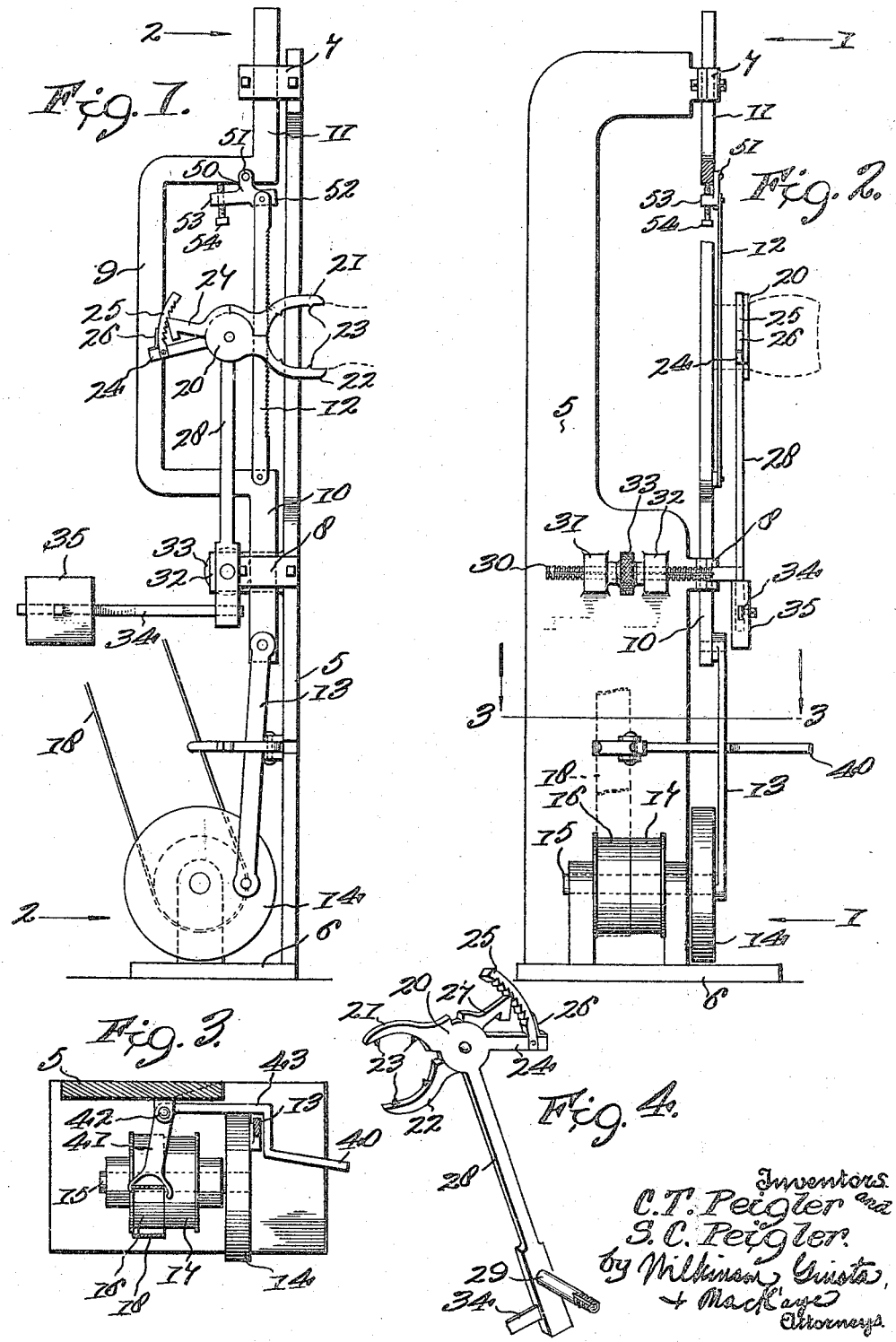

STANLEY CRITTENDEN PEIGLER AND COMMODORE THOMAS PEIGLER, OF GREENVILLE, SOUTH CAROLINA.

HEEL-CUTTING MACHINE.

1,229,130.   Specification of Letters Patent.   Patented June 5, 1917.

Application filed September 20, 1916. Serial No. 121,215.

*To all whom it may concern:*

Be it known that we, STANLEY CRITTENDEN PEIGLER and COMMODORE THOMAS PEIGLER, citizens of the United States, both residing at Greenville, in the county of Greenville and State of South Carolina, have invented certain new and useful Improvements in Heel-Cutting Machines; and we do hereby declare the following to be a full, clear, and exact description of the invention, such as will enable others skilled in the art to which it appertains to make and use the same.

Our invention relates to improvements in heel cutting machines, and it is intended to provide a machine which will cut off the heels from soles of shoes at any desired distance from the sole of the shoe for the purpose of adding thereto a heel cap of rubber or other material.

According to the custom now almost universally in use, the cobbler is obliged to do considerable manual labor to get the old heel in shape for the application of the rubber heel thereto, and then the heel removed is ordinarily worthless for other purposes; but in our invention nearly all of the labor is done by the machine and the old heel is evenly cut off, and ready for the application of the rubber cap. Moreover, the sawed off portion of the heel may be used for repairing other shoes.

Our invention will be more clearly understood by reference to the accompanying drawings in which similar parts are indicated by similar reference symbols throughout the several views.

Figure 1 is a side elevation of the machine as seen from the right of Fig. 2, and looking in the direction of the arrows 1—1 of Fig. 2;

Fig. 2 is the rear elevation as seen from the left of Fig. 1, and looking in the direction of the arrows 2—2 of Fig. 1, parts being broken away for the sake of clearness in the drawings;

Fig. 3 shows a section along the line 3—3 of Fig. 2, and looking down; and,

Fig. 4 is a detail showing in perspective the adjustable shoe clamp.

5 represents the main frame mounted on a bed plate or other support 6, which main frame has guides 7 and 8 for the guide bars 10 and 11 of the saw frame 9, which frame carries the saw 12. This saw frame is reciprocated by means of the connecting rod 13 pivotally connected to the fly wheel 14 mounted on the shaft 15, carrying the fast and loose pulleys 16 and 17, over one or the other of which the belt 18 passes. This belt is driven by any convenient source of power not shown.

20 represents the adjustable clamp for the shoe, which has two gripping jaws 21 and 22, provided with holding teeth 23 to engage the shoe, preferably in the crevice where the heel joins the upper.

The jaw 21 has an oppositely disposed arm 24, which carries the curved rack 25, normally pressed by the spring 26 into locking engagement with the pawl 27, which is integral with the other jaw 22 of the shoe clamp. The jaw 21 has also projecting downwardly therefrom the bar 28, which is provided with a laterally projecting screw bolt 29, having rectangular screw threads 30. This screw bolt 29 is splined in the sleeves 31 and 32 secured to, or integral with, the main frame 5, and between these sleeves the thumb nut 33 is mounted, by means of which the bar 28, and with it, the shoe clamp may be moved at right angles to the saw blade for the purpose of giving a deeper or shallower cut to the heel as may be desired. In order to automatically feed the heel to the saw, we attach an arm 34 to the heel of the bar 28, and mount on the said arm an adjustable weight 35; and the tendency of said weight is to draw the heel toward the saw.

By moving the weight in or out on the arm 34, the pressure of the heel against the saw teeth may be varied as desired. This weighted arm also has another function, in that when the saw has finished cutting through the heel, it will throw the shoe clamp backward, causing the weight arm 34 to strike the arm 40 of the belt shifter 41, which is pivoted at 42 to the main frame 5.

This arm 40 is preferably bent as at 43, so as not to interfere with the movement of the connecting rod 13, as shown in Fig. 3.

The saw may be permanently fixed in the saw frame 9, but for adjusting the tension on the saw, a tension device, such as shown in Figs. 1 and 2, may be provided, which comprises a bell crank 50, having one of its arms 51 pivoted to the saw frame, the other arm 52 connected to the saw, and the third arm 53 provided with internal screw threads to receive the adjusting screw 54. By screwing up or down on this screw 54, the tension of the saw may be varied as desired.

Moreover this tension device facilitates the removal of the saw for the purpose of repairs or substitution of another saw.

The operation of the device is as follows:

The shoe being inserted in the clamp, and the pawl engaged in the rack, the nut 33 is turned until the desired cut is indicated on the heel, as shown in Fig. 2; then the belt 18 is shifted to the fast pulley, and the saw is started. The operator is then free to attend to other work, for the saw will continue to operate on the heel until it cuts through the same, the cut portion of the heel falling to the ground while the shoe clamp will be thrown backward by the weighted arm 34, and this arm striking the arm 40 of the belt shifter will shift the belt from the fast to the loose pulley, and the saw will stop.

The shoe is now removed by springing back the rack 25, and swinging out the pawl 27, which will move the jaw 22 away from the jaw 21, and release the shoe, as shown most clearly in Fig. 4.

To put the machine in operation again, it will be sufficient to swing the shoe clamp to the forward position again, insert a fresh shoe and begin the operation as before.

We do not mean to limit ourselves to details of construction and mode of operation, except as particularly pointed out in the claims, and it will be obvious that various modifications might be made in the herein described apparatus and in the construction and operation of same, which might be used without departing from the spirit of our invention.

Having thus described our invention, what we claim and desire to secure by Letters Patent of the United States, is:

1. A heel cutting machine comprising, a main frame, provided with guides, a saw frame, carrying a saw, adapted to reciprocate on said guides, means for reciprocating said saw frame, a shoe holder mounted on said main frame in juxtaposition to the saw, means for pressing the shoe holder toward said saw, and means operated by said shoe holder, when the heel has been sawed through, for automatically stopping said saw frame and saw, substantially as described.

2. A heel cutting machine comprising, a main frame, provided with guides, a saw frame, carrying a saw, adapted to reciprocate in said guides, means for reciprocating said saw frame, a shoe holder mounted on said main frame in juxtaposition to the saw, a weighted arm for pressing the shoe holder toward said saw, and means operated by said weighted arm, when the heel has been sawed through, for automatically stopping said saw frame and saw, substantially as described.

3. A heel cutting machine comprising, a main frame, provided with guides, a saw frame, carrying a saw, adapted to reciprocate on said guides, means for reciprocating said saw frame, a shoe holder mounted on said main frame in juxtaposition to the saw, adjustable means for setting said shoe holder at the desired distance from said saw, means for pressing the shoe holder toward said saw, and means operated by said shoe holder, when the heel has been sawed through, for automatically stopping said saw frame and saw, substantially as described.

4. A heel cutting machine comprising, a main frame, provided with guides, a saw frame, carrying a saw, adapted to reciprocate in said guides, means for reciprocating said saw frame, a shoe holder mounted on said main frame in juxtaposition to the saw, adjustable means for setting said shoe holder at the desired distance from said saw, a weighted arm for pressing the shoe holder toward said saw, and means operated by said weighted arm, when the heel has been sawed through, for automatically stopping said saw frame and saw, substantially as described.

5. A heel cutting machine comprising, a main frame, provided with guides, a saw frame, carrying a saw, adapted to reciprocate on said guides, means for reciprocating said saw frame, comprising a belt and fast and loose pulleys, a shoe holder mounted on said frame in juxtaposition to the saw, means for pressing the shoe holder toward said saw, and means operated by said shoe holder, when the heel has been sawed through, for automatically shifting said belt and stopping said saw frame and saw, substantially as described.

6. A heel cutting machine comprising, a main frame, provided with guides, a saw frame, carrying a saw, adapted to reciprocate in said guides, means for reciprocating said saw frame, comprising a belt and fast and loose pulleys, a shoe holder mounted on said frame in juxtaposition to the saw, a weighted arm for pressing the shoe holder toward said saw, and a belt shifter operated by said weighted arm, when the heel has been sawed through, for automatically shifting said belt and stopping said saw frame and saw, substantially as described.

7. A heel cutting machine comprising, a main frame, provided with guides, a saw frame, carrying a saw, adapted to reciprocate on said guides, means for reciprocating said saw frame, a shoe holder mounted on said main frame in juxtaposition to the saw, said shoe holder comprising a pair of clamping jaws pivoted together and provided with teeth adapted to grip the shoe, and with a curved rack and pawl adapted to lock said jaws in the gripping position, means for pressing the shoe holder toward said saw, and means operated by said shoe holder, when the heel has been sawed through, for automatically stopping said saw frame and saw, substantially as described.

8. A heel cutting machine comprising, a main frame, provided with guides, a saw frame, carrying a saw, adapted to reciprocate in said guides, means for reciprocating said saw frame, a shoe holder mounted on said main frame in juxtaposition to the saw, said shoe holder comprising a pair of clamping jaws pivoted together and provided with teeth adapted to grip the shoe, and with a curved rack and pawl adapted to lock said jaws in the gripping position, a weighted arm for pressing the shoe holder toward said saw, and means operated by said weighted arm, when the heel has been sawed through, for automatically stopping said saw frame and saw, substantially as described.

9. A heel cutting machine comprising, a main frame, provided with guides, a saw frame, carrying a saw, adapted to reciprocate on said guides, means for reciprocating said saw frame, a shoe holder mounted on said main frame in juxtaposition to the saw, said shoe holder comprising a pair of clamping jaws pivoted together and provided with teeth adapted to grip the shoe, and with a curved rack and pawl adapted to lock said jaws in the gripping position, adjustable means for setting said shoe holder at the desired distance from said saw, means for pressing the shoe holder toward said saw, and means operated by said shoe holder, when the heel has been sawed through, for automatically stopping said saw frame and saw, substantially as described.

10. A heel cutting machine comprising, a main frame, provided with guides, a saw frame, carrying a saw, adapted to reciprocate in said guides, means for reciprocating said saw frame, a shoe holder mounted on said main frame in juxtaposition to the saw, said shoe holder comprising a pair of clamping jaws pivoted together and provided with teeth adapted to grip the shoe, and with a curved rack and pawl adapted to lock said jaws in the gripping position, adjustable means for setting said shoe holder at the desired distance from said saw, a weighted arm for pressing the shoe holder toward said saw, and means operated by said weighted arm, when the heel has been sawed through, for automatically stopping said saw frame and saw, substantially as described.

In testimony whereof, we affix our signatures.

STANLEY CRITTENDEN PEIGLER.
COMMODORE THOMAS PEIGLER.

Copies of this patent may be obtained for five cents each, by addressing the "Commissioner of Patents, Washington, D. C."